(12) United States Patent
Duppstadt

(10) Patent No.: US 6,764,180 B2
(45) Date of Patent: Jul. 20, 2004

(54) MULTIFOCAL CONTACT LENS AND METHOD OF MAKING THE SAME

(76) Inventor: Arthur G. Duppstadt, 100 Spring Valley Rd., Leechburg, PA (US) 15656

( * ) Notice: Subject to any disclaimer, the term of this patent is extended or adjusted under 35 U.S.C. 154(b) by 0 days.

(21) Appl. No.: 10/197,716

(22) Filed: Jul. 18, 2002

(65) Prior Publication Data

US 2002/0186345 A1 Dec. 12, 2002

Related U.S. Application Data

(62) Division of application No. 09/761,384, filed on Jan. 16, 2001, now Pat. No. 6,709,102.

(51) Int. Cl.$^7$ ................................................ G02C 7/02
(52) U.S. Cl. ...................................... 351/177; 351/161
(58) Field of Search ................................. 351/177, 161, 351/160 R, 160 H, 162

(56) References Cited

U.S. PATENT DOCUMENTS

| | | | | |
|---|---|---|---|---|
| 4,418,991 A | * | 12/1983 | Breger | 351/161 |
| 4,704,016 A | | 11/1987 | De Carle | 351/161 |
| 4,890,913 A | | 1/1990 | De Carle et al. | 351/161 |
| 4,921,205 A | * | 5/1990 | Drew, Jr. et al. | 249/61 |
| 5,151,723 A | | 9/1992 | Tajiri | 351/161 |
| 5,181,053 A | * | 1/1993 | Brown | 351/161 |
| 5,570,142 A | * | 10/1996 | Lieberman | 351/160 R |
| 5,574,518 A | | 11/1996 | Mercure | 351/161 |
| 5,619,289 A | | 4/1997 | Seidner et al. | 351/161 |
| 5,798,817 A | | 8/1998 | De Carle | 351/161 |
| 6,390,622 B1 | | 5/2002 | Muckenhirn et al. | 351/161 |
| 6,435,681 B2 | | 8/2002 | Portney | 351/161 |

* cited by examiner

Primary Examiner—Jordan M. Schwartz
(74) Attorney, Agent, or Firm—Arnold B. Silverman; Eckert Seamans Cherin & Mellott, LLC

(57) ABSTRACT

A multifocal contact lens structured to provide simultaneous distant and near vision includes a transparent lens body having an inner concave surface and an outer convex surface. The lens body has an aspherical central portion structured to provide distant vision and an adjacent annular spherical portion structured to provide near vision. The aspherical central portion, and annular spherical portion may be provided on the inner surface of the lens. In an alternate embodiment, a spherical central near vision portion and an annular aspheric distance vision portion may be employed. The spherical and aspherical portions merge in a gradual manner to avoid undesired liner of demarcation therebetween. A method of manufacturing a multifocal contact lens structured to provide simultaneous near and distant vision may include providing a contact lens blank having an outer surface and an inner surface and creating a generally spherical configuration in the inner surface, converting a center portion of the spherical concave inner surface into an aspherical configuration, and creating a generally spherical convex annular configuration in the outer surface. The method may be modified to provide the alternate embodiment.

7 Claims, 3 Drawing Sheets

MULTIFOCAL CONTACT LENS AND METHOD OF MAKING THE SAME

This application a divisional of U.S. patent application Ser. No. 09/761,384, filed Jan. 16, 2001, now U.S. Pat. No. 6,709,102.

BACKGROUND OF THE INVENTION

1. Field of the Invention

The present invention relates to a multifocal contact lens and methods of making the same and, more specifically, it relates to such a multifocal lens which facilitates simultaneous near and distant vision without having disruptive junctions between areas designed to facilitate such vision.

2. Description of the Prior Art

It has been known for individuals who require corrective vision for either distance viewing or near viewing, or both, to provide corrective eyeglasses which have, within the lens for each eye, a first segment adapted for distance vision and a second segment to be viewed separately for near vision.

It has also been known to provide trifocals which have three separate corrective lenses incorporated into a single lens. Such eyeglasses typically have very prominent divider lines between adjacent lens sections, which can be disruptive to one using the same.

It has also been known to attempt to provide eyeglasses with a transition zone between adjacent lens sections in a single lens to minimize the sometimes visually annoying prominent line of demarcation. Such transition zones typically provide for a blurred region between the two lenses as distinguished from a specific linear border.

It is also known that the sharp dividing line or the blending of the dividing line creates a small, optically useless, area of the lens. A measure of success occurs in eyeglasses because the lens is held stationary by the frame and the eyes can turn to select an area of the lens where these optical distractions will not enter the pupil. This is also the case with the translating bifocal or trifocal contact lens wearer whose lens must be fit loose enough for the eye to slide with respect to the lens, thereby allowing the pupil to line up with the appropriate segment of the lens.

It is also known that these segment boundaries are an optical problem with a simultaneous vision contact lens that has to center on the eye. All of these optical distractions, by position of the lens, must enter the pupil at the same time.

It is also known that the optical industry has created a progressive, variable focus, aspheric, multifocal spectacle lens. The distance vision part of the lens is disposed from the center of the pupil upward and the lens power can be confirmed with the lensometer. From the center of the pupil, downward, there is an aspheric curve that gradually increases in power to its full reading power near the bottom of the lens.

The aspheric spectacle lens is such that the pupil can line up with a portion of reading power that is most appropriate for that certain reading distance, thereby eliminating all of the distance rays and many unwanted other rays of light. The simultaneous, aspheric, multifocal contact lens must accept all rays, distance and near, because they are entering the pupil at one and the same time. Without a spherical, well-focused reading portion that can be measured in the lensometer, reading is compromised.

The point where the reading power starts on the lens is imperceptible to gross inspection. These aspheric (progressive) lenses offer excellent distance vision and good reading characteristics occur when the pupil is in line with the part of the lens that is most optically correct for the distance of the reading task. The reading vision power, however, is not as good as if one were looking through a spherical lens focused for that exact distance.

It has also been known to provide aspheric, simultaneous, multifocal contact lenses with the far vision in the center of the lens and progressively more reading power from the center to the edge. The lensometer can record the distance power, but fails on the reading power.

It is also known that the lensometer is somewhat analogous to the eye. A lens power that focuses poorly, or not at all, in the lensometer will not provide optimum vision for the person using the same.

It has been known that the shape of the human cornea is generally spherical.

It has been known that an aspheric curve is generally cone-shaped and when applied to fitting the cornea, exhibits a "dunce cap" type fit that bears heavily on an annular zone generally adjacent to the mid-periphery of the cornea. This can result in corneal molding that is physiologically unhealthy and optically undesirable if the wearer wants to use his or her back-up spectacles at any time.

It has also been known to have bifocal contact lenses. See generally, U.S. Pat. Nos. 4,704,016; 4,890,913; 5,151,723; and 5,798,817. U.S. Pat. No. 4,890,913 discloses a multifocal contact lens having a plurality of concentric viewing zones, some of which are adapted for near vision and others for distant vision. It is stated to be an objective to provide the zones such that substantially equal amounts of light enter the eye through both the near and distant zones. One of the objectives was said to be in constructing the concentric zones to form alternating steeper and flatter curves such that a continuous tear film exists between the cornea and the back of the lens. The disclosure suggests manufacture of the lens by machining on a lathe or by molding. A number of resinous materials are identified. See also, U.S. Pat. No. 4,704,016 with respect to which U.S. Pat. No. 4,890,913 was a continuation-in-part application. U.S. Pat. No. 4,704,016 also discloses different types of distinct zones for near and distant vision U.S. Pat. No. 5,798,817 discloses bifocal contact lenses having a plurality of near vision zones and a plurality of distant vision zones. At least one of the near vision zones was said to be an aspherical, lenticular surface.

U.S. Pat. No. 5,151,723 discloses a multifocal contact lens. It states that there have been known previously three principal types of bifocal contact lenses. One is simultaneous vision or concentric lenses. The second is alternating vision lenses, and the third is diffraction or halographic lenses. It also states that is has been known to provide simultaneous vision lenses which are physically symmetric in design and are manufactured with a central zone having prescriptive power suitable for a patient's distant vision and a peripheral rim of a different prescriptive value for a patient's near vision.

Despite the foregoing, there remains a very real and substantial need for an improved multifocal contact lens which permits simultaneous distance and near vision and provides additional benefits, such as elimination of a pronounced line of demarcation between adjacent zones.

SUMMARY OF THE INVENTION

The present invention has met the above-described need by providing a multifocal contact lens having a transparent lens body provided with an inner concave surface and an outer convex surface. In the preferred embodiment an aspheric central portion is structured to provide distance vision, and an adjacent annular spherical portion is structured to provide near vision. The aspheric central portion of the lens has a progressively flattened curve as it extends toward the radially inner part of the spherical portion and has a radius substantially equal to the adjacent radially inner portion of the spherical portion and thereby eliminates the objectionable visible junction therebetween.

In a preferred embodiment, the aspherical central portion will be formed within the inner surface of the lens, as will the annular spherical portion.

In an alternate embodiment, the central aspherical portion and spherical portion may be formed in the outer surface of the lens.

In another embodiment a spherical reading central portion and an outer aspherical distance portion may be employed without a pronounced line therebetween.

The invention also provides a method of manufacturing a multifocal contact lens which includes creating a contact lens blank having an outer surface and an inner surface creating a generally spherical concave configuration in the inner surface, converting the center portion of the generally spherical concave inner surface into an aspherical configuration, converting a portion of said inner surface disposed radially outwardly of said center portion into a spherical concave portion, and creating a generally spherical convex configuration in said outer surface.

The method may also include establishing a central spherical reading portion and an outer said aspherical distance portion adjacent to the central generally spherical adjacent portion.

It is an object of the present invention to improve multifocal contact lenses for simultaneous distant and near vision.

It is a further object of the present invention to provide such a contact lens which has an aspherical inner portion structured for distance vision to intermediate near vision with an adjacent annular spherical portion structured for near reading.

It is another object of the present invention to provide such a multifocal lens which has only one single distance to intermediate vision portion and only one single near-reading vision portion.

It is a further object of the present invention to provide a method of making such a lens.

It is a further object of the present invention to provide such a lens which may be made of conventional materials using previously known techniques adapted to the method of the present invention.

It is yet another object of the present invention to provide a multifocal contact lens with in-focus, non-clashing, rays of light which originate from distance to reading distances and all points in between.

It is a further object of the present invention to provide such a contact lens which does not have an objectionable, visually perceptible line of demarcation between the distant vision and near vision portions.

These and other objects of the present invention will be more fully understood from the description of the invention with reference to the drawings appended hereto.

DESCRIPTION OF THE PREFERRED EMBODIMENTS

As employed herein, reference to "distance vision" or "distant vision" will refer generally to far distances to intermediate distances, which are beyond general reading distances, and may be on the order of about 20 inches to infinity, and "reading vision" or "near vision" will refer generally to the distance from the eye that one would hold a book or document being read and may be on the order of about 12 inches up to 20 inches.

As employed herein "contact lenses" will refer to contact lenses and surgically implantable lenses.

Figure 1:
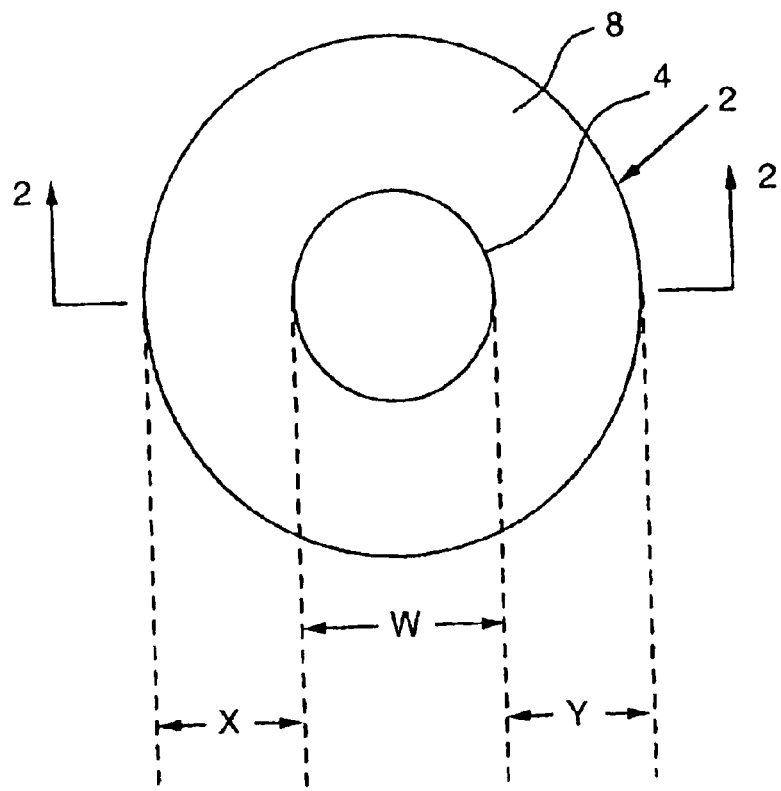
FIG. 1 is a top plan view showing a form of multifocal contact lens of the present invention.
Figure 2:
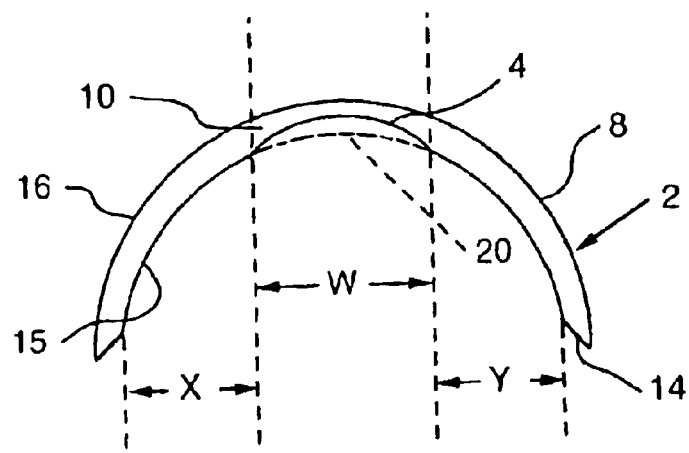
FIG. 2 is a cross-sectional illustration taken through 2—2 of FIG. 1.

FIG. 1 shows a top plan view of a contact lens 2 which has a central portion 4, which is aspheric, and will be spaced from the cornea and an annular adjacent portion 8, which is substantially spherical. While for clarity of illustration, the aspheric central portion 4 has been exaggerated, as shown in FIG. 2, it will be appreciated that the surface 4 is relatively close to line 20 in order to minimize the likelihood that an air bubble would be trapped between surface 4 and the adjacent cornea of the user thereby impairing vision. In the preferred illustrated form of the invention, the central portion 4 progressively flattens toward the radially outermost portions which has a radius substantially equal to that of the adjacent or abutting spherical portion 8. This provides a smooth transition between central aspheric portion 4 and annular spherical portion 8. It functions to eliminate or substantially reduce any readily-visible transition line between aspheric central portion 4 and annular generally spherical portion 8 which is the fitting or reading zone. The lens 2 terminates in a tapered bevel surface 14, as shown in FIG. 2 which facilitates positioning the lens in comfortable engagement with the eye. The lens has an inner generally concave surface 15 and an outer generally convex spherical surface 16.

In the embodiment illustrated in FIGS. 1 and 2, the central aspherical portion 4 and the generally spherical annular portion 8, are formed within the inner surface 15. If desired, the inner surface 15 may be made generally spherical and the outer portion may have the central aspherical portion 4, and the generally spherical annular portion 8.

The lens of the present invention provides simultaneous viewing of both distant and near vision, with the aspheric central portion 4 being structured to provide the distance vision and the substantially spherical annular portion 8 disposed radially outwardly of and adjacent to the aspheric central portion 4 providing near vision. In the preferred embodiment, these will be the only two lens vision portions.

In a preferred embodiment, the central zone will be of a width that allows its rays and the rays from the spherical outer portion to enter the pupil simultaneously. The dashed-line 20, shown in FIG. 2, shows through the spherical dimensions of the annular spherical portion 8 and illustrates the differences in the curved surfaces between the aspheric central portion 4 and the annular generally spherical portion 8. In a preferred embodiment of the invention, the aspheric central portion 4 will have a width W, which may be about 2.5 to 4 mm. The annular generally spherical portion will have each radial sector, such as X or Y, preferably having a width of about 3.5 to 5.5 mm. It is desired that the overall width of the combined lens portions 4, 8 (the sum of W+X+Y) equals about the maximum pupil width in the user and preferably slightly larger than such maximum pupil opening in order to facilitate simultaneous near and distant vision. It is also a function of the corneal fits. The lens will preferably have an overall width of about 9 to 10.4 mm.

The dashed line 20 illustrates the difference in thickness between aspheric central portion 4 and annular generally spherical portion 8. It is preferred that the aspheric central portion 4 and the annular spherical portion 8 have a minimum thickness of about 0.1 mm. The thickness of the portions 4, 8 is controlled by the size lens needed to fit a certain cornea, the pupil size and the powers needed for distance and near vision.

The lenses of the present invention preferably have only one aspherical portion, which is aspherical portion 4, which is structured for distance vision and only one annular substantially spherical portion 8, which is disposed adjacent to the aspherical central portion 4. The central portion 4 as it extends radially outwardly has a transition which will be a gradual one from the thickness and curvature of the aspherical portion 4 to the spherical portion 8 to thereby eliminate abrupt borders which tend to interfere with efficiency of vision and comfort of the user.

The lens of the present invention functions best when it is centered over the pupil. The present invention also may provide an aspheric-fitting reading outer portion with a low eccentricity value (a slight cone) could be used to fit a certain odd-shaped cornea and not adversely affect the reading if desired.

In an alternate embodiment, the spherical reading portion may be positioned in the center and the aspheric distance portion may be an annular portion therearound thereby reversing the positions shown in FIGS. 1 and 2.

It will be appreciated that the multifocal contact lenses of the present invention may be manufactured by conventional techniques, such as machining on a lathe or molding, if desired, out of conventional, resinous, plastic materials, which are well known to those skilled in the art. They also may be sized and fitted in a conventional manner.

Figure 3:
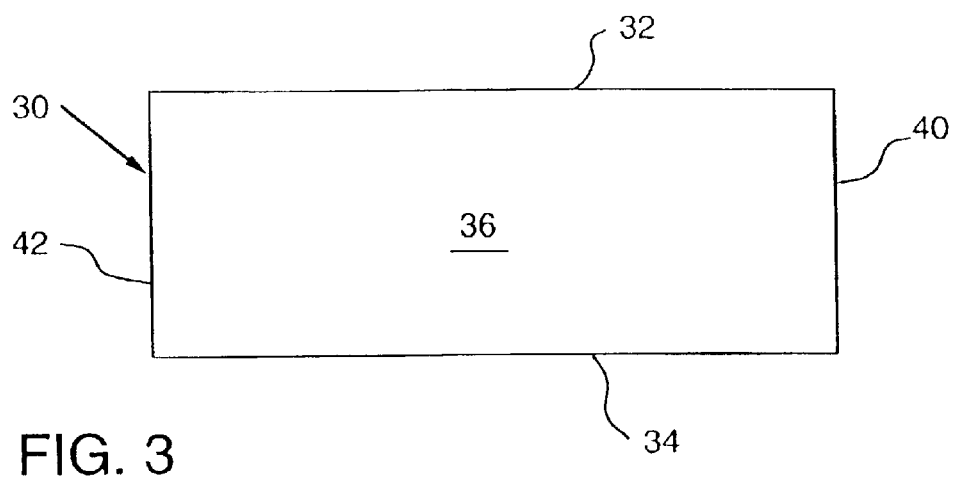
FIG. 3 is an elevational view of a contact lens blank from which a contact lens of the present invention may be made.

Referring now to FIGS. 3–6, a preferred method of making the invention will be considered. As shown in FIG. 3, a contact lens blank 30, which may be generally rectangular in cross section, having an upper surface 32, a lower surface 34, both of which are planar and generally parallel to each other, a front face 36, and an equally-sized parallel rear face (not shown) as well as end surfaces 40, 42, which are generally planar and parallel to each other, may be provided. The blank 30 which may be generally cylindrical may have a diameter of about 0.5 to 0.75 inch, a height of about 3/16 to 3/8 inch. The blank be made of a suitable, resinous plastic, such as polyolxylacrylate, fluoroacrylate, silicone, acrylate, pemufocone-A, flurosticate or a firm lens material, for example. It may be made of any soft lens material, which is sufficiently firm or thick, to maintain the shape of the central aspheric portion of the lens.

Figure 4:
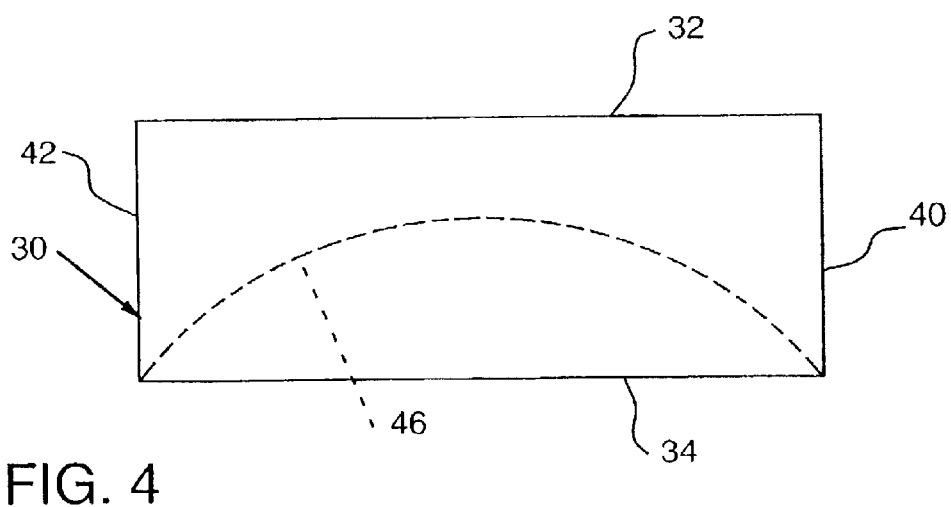
FIG. 4 shows a stage of forming a contact lens of the present invention from the blank of FIG. 3.
Figure 5:
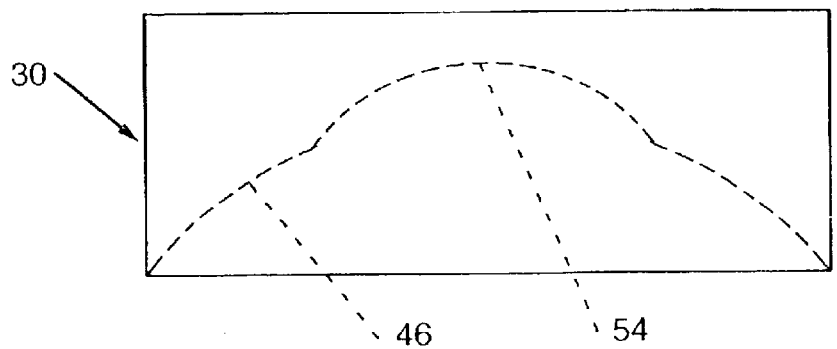
FIG. 5 shows an intermediate stage of formation of a contact lens of the present invention.
Figure 6:
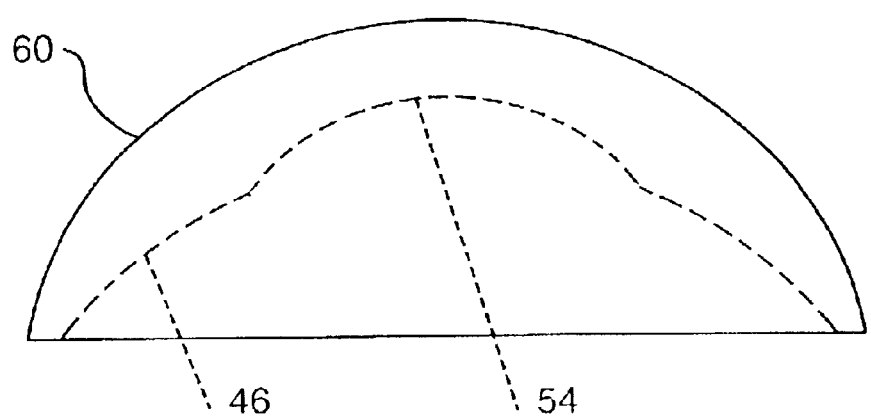
FIG. 6 shows a form of contact lens of the present invention.

In the illustrated method of making the lens, the lower surface 34 is subjected to a machining operation so as to establish a downwardly concave generally spherical inner surface 46 of FIG. 4. Progressing to FIG. 5, the generally spherical inner surface 46 has a portion 54 converted into what will become the aspheric central portion while retaining the annular spherical shape 46 in the remainder. The transition will be formed within the radially outer portion of aspheric central portion 54 abutting annular spherical portion 46. Finally, as shown in FIG. 6, an outer spherical surface 60 is established, thereby completing construction of the contact lens.

The present lens may employ a wide range of dimensions in respect of aspheric control portion 4 and annular spherical portion 8. It is preferred that aspheric central portion 4 be a generally conical section having an eccentricity of at least 1 and the annular spherical portion 8 have a radius of about 7.00 to 8.70 mm.

In the embodiment wherein the spherical reading or near vision portion is positioned in the center and the aspheric distance vision portion is annular and radially outwardly thereof, corresponding changes in the contour created by the method will be made.

It will be appreciated, therefore, that the present invention provides a multifocal contact lens adapted for simultaneous near vision through an annular spherical portion and distant vision through a centrally-disposed aspherical portion with the aspherical portion or the reverse eliminate undesired sharp dividing transitions between the distant and near portions of the lens. It is preferred that only a single aspheric portion, such as 4, be provided and that only a single annular generally spherical portion 8 be provided.

While for convenience of reference herein, the methods shown in FIGS. 3–6 have been machining methods involving progressive forming in a lathe, it will be appreciated that this desired other means, such as a molding of the resinous material, may be employed. It will be appreciated that the lens is in a preferred form composed of a single material which through differences in thickness and shape provide the central aspheric distance portion 4 and the generally spherical annular near vision portion 8.

While in the preferred form shown, the inner surface has been subjected to contouring to establish the aspheric central portion 4 and generally spherical near distance portion 8, the contouring may be affected on the outer surface of the lens with the interior surface being substantially spherical.

It will be appreciated, therefore, that the present invention provides an effective multifocal contact lens which facilitates both distant and reading vision (as defined herein) simultaneously without the presence of an objectionable junction between the central aspheric and annular spherical zones. It also provides a method of making such a lens.

Whereas particular embodiments have been described herein for purposes of illustration, it will be evident to those skilled in the art that numerous variations of the details may be made without departing from the invention as defined in the appended claims.

What is claimed is:

1. A method or making a multifocal contact lens comprising:

creating a contact lens blank having an outer surface and an inner surface, creating a generally spherical surface in said inner surface, converting a portion of said generally spherical surface into a primarily aspherical surface, creating a generally spherical configuration in said outer surface, creating said primarily surface in the center of said inner surface, creating said generally spherical surface in an annular configuration in surrounding adjacent relationship with respect to said aspherical surface, and establishing in said aspheric central surface abutting said annular spherical surface a generally spherical portion of generally the same radius as said spherical surface.

2. The method of claim 1 including employing as said contact lens blank a substantially cylindrical blank having a generally planar said outer surface and a generally planar said inner surface.

3. The method of claim 1 including establishing said aspheric central surface with a diameter of about 2.5 to 4 mm.

4. The method of claim 1 including establishing said annular spherical surface with the width of about 3.5 to 5.5 mm on each side o said central surface.

5. The method of claim 1 including establishing said central surface with minimum thickness of at least 0.1 mm.

6. The method of claim 1 including creating said contact lens with a structure for providing simultaneous distant and near vision.

7. The method of claim 1 including creating only one aspherical portion and only one annular spherical portion in said lens.

* * * * *

UNITED STATES PATENT AND TRADEMARK OFFICE
CERTIFICATE OF CORRECTION

PATENT NO. : 6,764,180 B2
DATED : July 20, 2004
INVENTOR(S) : Arthur G. Duppstadt It is certified that error appears in the above-identified patent and that said Letters Patent is hereby corrected as shown below:

Column 1,
Line 4, insert -- is -- after "application".

Column 2,
Line 42, insert a -- . -- after "vision".

Column 6,
Line 58, "or" should read -- of --.

Column 7,
Line 1, insert -- aspherical -- after "primarily".

Column 8,
Line 3, "o" should read -- of --.

Signed and Sealed this

Eighth Day of February, 2005

JON W. DUDAS
*Director of the United States Patent and Trademark Office*